United States Patent
Khatwa et al.

(10) Patent No.: US 9,517,844 B2
(45) Date of Patent: Dec. 13, 2016

(54) SYSTEM AND METHOD FOR DISPLAYING AIRPORT FEATURES ON A DYNAMIC AIRPORT MOVING MAP DISPLAY

(71) Applicant: HONEYWELL INTERNATIONAL INC., Morristown, NJ (US)

(72) Inventors: Ratan Khatwa, Sammamish, WA (US); Melissa Ziarnick, Anthem, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 402 days.

(21) Appl. No.: 14/036,181

(22) Filed: Sep. 25, 2013

(65) Prior Publication Data

US 2015/0084793 A1    Mar. 26, 2015

(51) Int. Cl.
   *B64D 45/00*    (2006.01)
   *G08G 5/00*     (2006.01)
   *G08G 5/06*     (2006.01)

(52) U.S. Cl.
   CPC ............. *B64D 45/00* (2013.01); *G08G 5/0021* (2013.01); *G08G 5/065* (2013.01)

(58) Field of Classification Search
   USPC .... 340/969, 971, 972, 980, 979; 701/16, 10; 342/104, 175; 348/844
   See application file for complete search history.

(56) References Cited

U.S. PATENT DOCUMENTS

| | | | |
|---|---|---|---|
| 8,306,745 B1 | 11/2012 | Clark et al. | |
| 2004/0243307 A1 | 12/2004 | Geelen | |
| 2008/0275642 A1* | 11/2008 | Clark | G08G 5/0021 701/457 |
| 2011/0125399 A1 | 5/2011 | Clark et al. | |
| 2013/0035848 A1 | 2/2013 | Burgin et al. | |
| 2013/0169450 A1 | 7/2013 | He | |

FOREIGN PATENT DOCUMENTS

| | | |
|---|---|---|
| EP | 1463014 A2 | 9/2004 |
| EP | 2355071 A1 | 8/2011 |
| WO | 03071228 A2 | 8/2003 |

OTHER PUBLICATIONS

Lars Placke, Navigation apparatus for destination guidance of a vehicle, Sep. 2004, EP1463014 (A2) (English translation).*
Yeh, M.: "Surface Moving Map Industry Survey" Air Traffic Organization Operations Planning, Human Factors Research and Engineering Group, Aug. 2009.
EP Extended Search Report for Application No. 14183997.7 dated Mar. 23, 2015.

* cited by examiner

*Primary Examiner* — Hongmin Fan
(74) *Attorney, Agent, or Firm* — Lorenz & Kopf, LLP (57) ABSTRACT

A method and apparatus is provided for enhancing situational awareness onboard an aircraft during an aircraft ground maneuver such as when taxiing on a runway or taxiway. A three-dimensional view including airport features is rendered in a first airport region that extends a first predetermined distance ($D_1$) from the aircraft when the aircraft speed is less than a predetermined speed ($V_1$). A three-dimensional view including airport features in a second airport region is rendered that extends beyond $D_1$ when the aircraft speed exceeds $V_1$.

12 Claims, 6 Drawing Sheets

SYSTEM AND METHOD FOR DISPLAYING AIRPORT FEATURES ON A DYNAMIC AIRPORT MOVING MAP DISPLAY

TECHNICAL FIELD

Embodiments of the subject matter described herein relate generally to avionics systems such as flight display systems and, more particularly, to a flight deck display system that generates a dynamic synthetic display of a three-dimensional (3D) airport moving map (AMM).

BACKGROUND

Modern flight deck displays for vehicles (such as aircraft or spacecraft) display a considerable amount of information, such as vehicle position, speed, altitude, navigation, target, and terrain information. A 3-D AMM displays a synthetic view of the airport environment that enhances flight crew position and situational awareness during both taxi operations and final approach. It is known that a pilot may view the 3D AMM as a virtual image from inside the flight deck (referred to as an egocentric view or conventional synthetic display (SVD)) or as a view from behind and above the aircraft (referred to as an exocentric view). The exocentric view is preferred during taxi operations, and the map provides representations of various features including, for example, runways, current and adjacent taxiways, upcoming runway and taxiway centerlines, runway markings, runway signage and identification signs, hold short lines, aircraft parking spaces, airport structures, runway incursion hotspots, and the like.

Currently, features on the map fade into view at a specified (i.e. fixed) distance from the front of the aircraft as the aircraft approaches. However, there is no compensation for aircraft groundspeed. Thus, groundspeed has no impact on when critical features such as runway and taxiway signs, runway incursion hotspots, and the like are displayed.

Accordingly, it would be desirable to increase a pilot's situational awareness by providing an onboard avionics system and method that, in turn, provides a flight crew with more timely graphic representations of the various features of an airport environment. It would further be desirable to provide an improved AMM that takes into account aircraft groundspeed to determine the onset or fade-in of displaying features that is currently based on the distance from the aircraft. Furthermore, other desirable features and characteristics will become apparent from the subsequent detailed description and the appended claims, taken in conjunction with the accompanying drawings and the foregoing technical field and background.

BRIEF SUMMARY

A method is provided for enhancing situational awareness onboard an aircraft during an aircraft ground maneuver. The method comprises increasing the depth of the field-of-view of a three dimensional flight deck display in response to the aircraft attaining a speed that exceeds a predetermined speed.

A method is also provided for displaying a dynamic synthetic view of an airport moving map on a flight deck display system. The method comprises receiving airport feature data, aircraft speed data, and position data. A three-dimensional view including airport features is rendered on the display in a first airport region that extends a first predetermined distance ($D_1$) from the aircraft when the aircraft speed is less than a predetermined speed ($V_1$). A three-dimensional view including airport features is rendered in a second airport region that extends a second predetermined distance ($D_2$) from the aircraft when the aircraft speed exceeds predetermined speed ($V_1$), where $D_2$ is greater than $D_1$.

A flight deck display system is also provided, comprising a first source of aircraft feature data, a second source of aircraft speed data, a third source of aircraft position data, and a display. A processor is operatively coupled to the first, second, and third sources and to the display and is configured to (1) access the first, second, and third sources; (2) render on the display a three-dimensional view including airport features in a first airport region that extends a first predetermined distance ($D_1$) from the aircraft when the aircraft speed is less than a predetermined speed ($V_1$); and (3) render on the display a three-dimensional view including airport features in a second airport region that extends a second predetermined distance ($D_2$) from the aircraft when the aircraft speed exceeds $V_1$, where $D_2$ is greater than $D_1$.

BRIEF DESCRIPTION OF THE DRAWINGS

A more complete understanding of the subject matter may be derived by referring to the following detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The system and methods described herein can be deployed with any vehicle, including aircraft, automobiles, spacecraft, watercraft, and the like. The preferred embodiments of the system and methods described herein represent an intelligent way to present visual airport information to a pilot or flight crew during operation of the aircraft and, in particular, during taxi operations and final approach.

Figure 1:
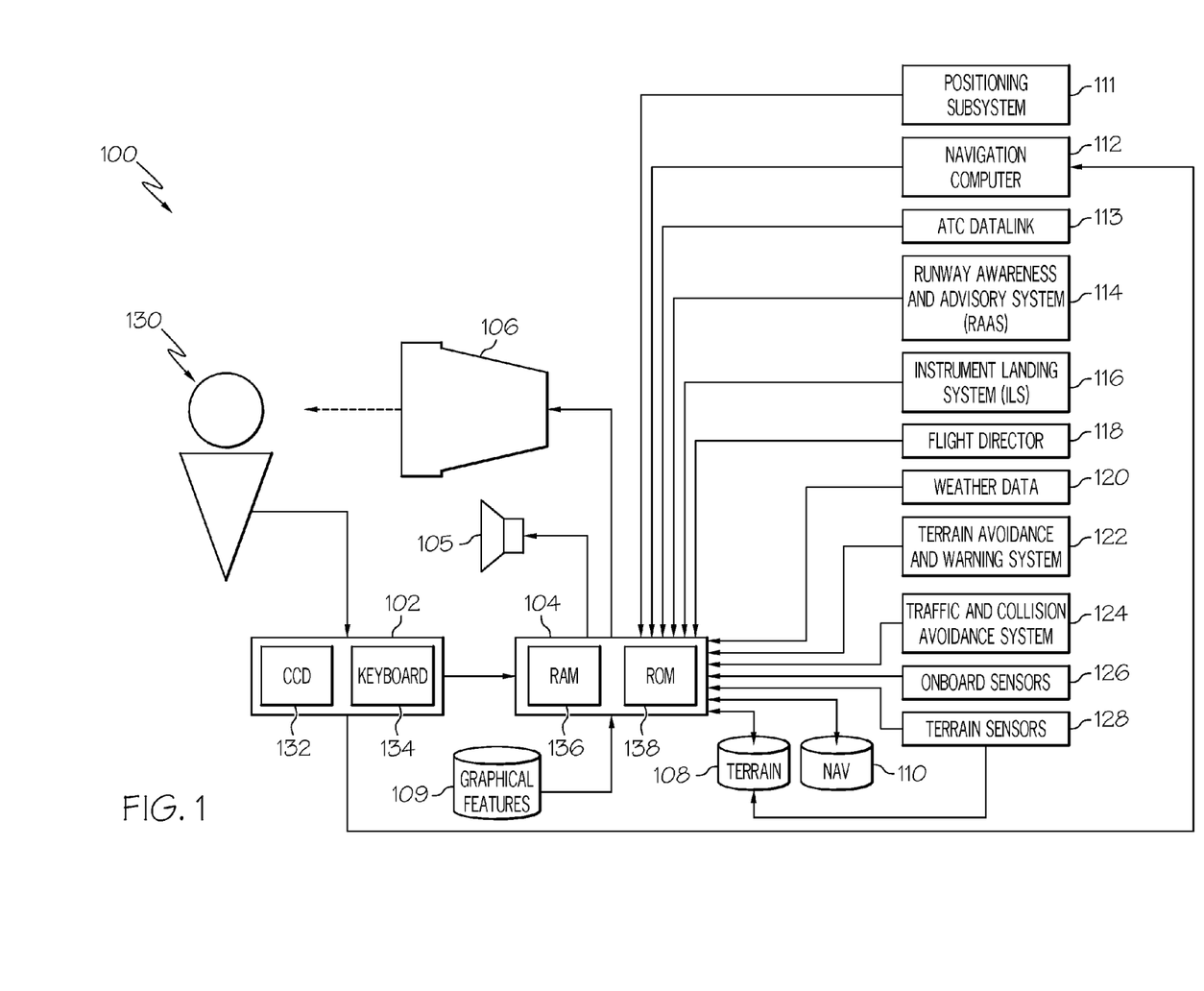
FIG. 1 is a block diagram of an embodiment of a flight deck display system.

Turning now to the drawings, FIG. 1 depicts an exemplary flight deck display system 100 (suitable for a vehicle such as an aircraft) that generally includes, without limitation: a user interface 102; a processor architecture 104 coupled to the user interface 102; an aural annunciator 105; and a display element 106 coupled to the processor architecture 104. The system 100 may also include, cooperate with, and/or communicate with a number of databases, sources of data, or the like. Moreover, the system 100 may include, cooperate with, and/or communicate with a number of external subsystems as described in more detail below. For example, the processor architecture 104 may cooperate with one or more of the following components, features, data sources, and subsystems, without limitation: one or more terrain databases 108; one or more graphical airport feature databases 109; one or more navigation databases 110; a positioning subsystem 111; a navigation computer 112; an air traffic control (ATC) data link subsystem 113; a runway awareness and advisory system (RAAS) 114; an instrument landing system (ILS) 116; a flight director 118; a source of weather data 120; a terrain avoidance and warning system (TAWS) 122; a traffic and collision avoidance system (TCAS) 124; one or more onboard sensors 126; and one or more terrain sensors 128.

The user interface 102 is in operable communication with the processor architecture 104 and is configured to receive input from a user 130 (e.g., a pilot) and, in response to the user input, supply command signals to the processor architecture 104. The user interface 102 may be any one, or combination, of various known user interface devices including, but not limited to, a cursor control device (CCD) 132, such as a mouse, a trackball, or joystick, one or more buttons, switches, or knobs. In the depicted embodiment, the user interface 102 includes the CCD 132 and a keyboard 134. The user 130 manipulates the CCD 132 to, among other things, move cursor symbols that might be rendered at various times on the display element 106, and the user 130 may manipulate the keyboard 134 to, among other things, input textual data. As depicted in FIG. 1, the user interface 102 may also be utilized to enable user interaction with the navigation computer 112, the flight management system, and/or other features and components of the aircraft.

The processor architecture 104 may utilize one or more known general-purpose microprocessors or an application specific processor that operates in response to program instructions. In the depicted embodiment, the processor architecture 104 includes or communicates with onboard RAM (random access memory) 136, and onboard ROM (read only memory) 138. The program instructions that control the processor architecture 104 may be stored in either or both the RAM 136 and the ROM 138. For example, the operating system software may be stored in the ROM 138, whereas various operating mode software routines and various operational parameters may be stored in the RAM 136. It will be appreciated that this is merely exemplary of one scheme for storing operating system software and software routines, and that various other storage schemes may be implemented. It will also be appreciated that the processor architecture 104 may be implemented using various other circuits, not just a programmable processor. For example, digital logic circuits and analog signal processing circuits could also be used.

The processor architecture 104 is in operable communication with the terrain database 108, the graphical airport features database 109, the navigation database 110, and the display element 106, and is coupled to receive various types of data, information, commands, signals, etc., from the various sensors, data sources, instruments, and subsystems described herein. For example, the processor architecture 104 may be suitably configured to obtain and process real-time aircraft status data (e.g., avionics-related data) as needed to generate a graphical synthetic perspective representation of terrain in a primary display region. The aircraft status or flight data may also be utilized to influence the manner in which graphical features (associated with the data maintained in the graphical airport features database 109) of a location of interest such as an airport are rendered during operation of the aircraft. For the exemplary embodiments described here, the graphical airport features database 109 may be considered to be a source of airport feature data that is associated with synthetic graphical representations of one or more airport fields.

For this embodiment, the graphical airport features database 109 is an onboard database that contains pre-loaded airport feature data including geo-referenced features such as runway length, taxiway length, markings, signage, centerlines, etc. In alternate embodiments, some or all of the airport feature data can be loaded into the graphical features database 109 during flight. Indeed, some airport feature data could be received by the aircraft in a dynamic manner as needed. The airport feature data accessed by the processor architecture 104 is indicative of displayable visual features of one or more airports of interest. In practice, the airport feature data can be associated with any viewable portion, aspect, marking, structure, building, geography, and/or landscaping located at, on, in, or near an airport. The processing and rendering of the airport feature data will be described in more detail below.

Depending upon the particular airport field, the airport feature data could be related to any of the following visually distinct features, without limitation: a runway; runway markings and vertical signage; a taxiway; taxiway markings and vertical signage; a ramp area and related markings; parking guidance lines and parking stand lines; a terminal or concourse; an air traffic control tower; a building located at or near the airport; a landscape feature located at or near the airport; a structure located at or near the airport; a fence; a wall; a vehicle located at or near the airport; another aircraft located at or near the airport; a light pole located at or near the airport; a power line located at or near the airport; a telephone pole located at or near the airport; an antenna located at or near the airport; construction equipment, such as a crane, located at or near the airport; a construction area located at or near the airport; trees or structures or buildings located around the airport perimeter; and bodies of water located in or around the airport. More particularly, runway-specific feature data could be related to, or indicate, without limitation: arresting gear location; blast pad; closed runway; rollout lighting; runway centerlines; runway displaced thresholds; runway edges; runway elevation; runway end elevation; runway exit lines; runway heading; runway Land And Hold Short lines; runway intersections; runway labels;

runway landing length; runway length; runway lighting; runway markings; runway overrun; runway shoulder; runway slope; runway stop ways; runway surface information; runway that ownship is approaching; runway threshold; runway weight bearing capacity; and runway width.

In certain embodiments, the processor architecture 104 is configured to respond to inertial data obtained by the onboard sensors 126 to selectively retrieve terrain data from the terrain database 108 or the terrain sensor 128, to selectively retrieve navigation data from the navigation database 110, and/or to selectively retrieve graphical features data from the graphical features database 109, where the graphical features data corresponds to the location or target of interest. The processor architecture 104 can also supply appropriate display commands (e.g., image rendering display commands) to the display element 106, so that the retrieved terrain, navigation, and graphical features data are appropriately displayed on the display element 106. Processor architecture 104 also provides appropriate commands to aural annunciator 105 (e.g. aural alert generating commands including those related to runway and taxiway alerts). The processor architecture 104 may be further configured to receive real-time (or virtually real-time) airspeed, altitude, attitude, waypoint, and/or geographic position data for the aircraft and, based upon that data, generate image rendering display commands associated with the display of terrain.

The display element 106 is used to display various images and data, in both a graphical and a textual format, and to supply visual feedback to the user 130 in response to the user input commands supplied by the user 130 to the user interface 102. It will be appreciated that the display element 106 may be any one of numerous known displays suitable for rendering image and/or text data in a format viewable by the user 130. Non-limiting examples of such displays include various cathode ray tube (CRT) displays, and various flat panel displays such as, various types of LCD (liquid crystal display), OLED, and TFT (thin film transistor) displays. The display element 106 may additionally be based on a panel mounted display, a HUD projection, or any known technology. In an exemplary embodiment, the display element 106 includes a panel display, and the display element 106 is suitably configured to receive image rendering display commands from the processor architecture 104 and, in response thereto, the display element 106 renders a synthetic graphical display having a perspective view corresponding to a flight deck viewpoint. In certain situations, the display element 106 receives appropriate image rendering display commands and, in response thereto, renders a synthetic representation of an airport field. The graphically rendered airport field might include conformal graphical representations of taxiways, runways, and signage rendered on the taxiways. To provide a more complete description of the operating method that is implemented by the flight deck display system 100, a general description of exemplary displays and various graphical features rendered thereon will be provided below.

As FIG. 1 shows, the processor architecture 104 is in operable communication with the source of weather data 120, the TAWS 122, and the TCAS 124, and is additionally configured to generate, format, and supply appropriate display commands to the display element 106 so that the avionics data, the weather data 120, data from the TAWS 122, data from the TCAS 124, and data from the previously mentioned external systems may also be selectively rendered in graphical form on the display element 106. The data from the TCAS 124 can include Automatic Dependent Surveillance Broadcast (ADS-B) messages.

The terrain database 108 includes various types of data, including elevation data, representative of the terrain over which the aircraft is flying. The terrain data can be used to generate a three dimensional perspective view of terrain in a manner that appears conformal to the earth. In other words, the display emulates a realistic view of the terrain from the flight deck or cockpit perspective. The data in the terrain database 108 can be pre-loaded by external data sources or provided in real-time by the terrain sensor 128. The terrain sensor 128 provides real-time terrain data to the processor architecture 104 and/or the terrain database 108. In one embodiment, terrain data from the terrain sensor 128 is used to populate all or part of the terrain database 108, while in another embodiment, the terrain sensor 128 provides information directly, or through components other than the terrain database 108, to the processor architecture 104.

In another embodiment, the terrain sensor 128 can include visible, low-light TV, infrared, or radar-type sensors that collect and/or process terrain data. For example, the terrain sensor 128 can be a radar sensor that transmits radar pulses and receives reflected echoes, which can be amplified to generate a radar signal. The radar signals can then be processed to generate three-dimensional orthogonal coordinate information having a horizontal coordinate, vertical coordinate, and depth or elevation coordinate. The coordinate information can be stored in the terrain database 108 or processed for display on the display element 106.

In one embodiment, the terrain data provided to the processor architecture 104 is a combination of data from the terrain database 108 and the terrain sensor 128. For example, the processor architecture 104 can be programmed to retrieve certain types of terrain data from the terrain database 108 and other certain types of terrain data from the terrain sensor 128. In one embodiment, terrain data retrieved from the terrain sensor 128 can include moveable terrain, such as mobile buildings and systems. This type of terrain data is better suited for the terrain sensor 128 to provide the most up-to-date data available. For example, types of information such as water-body information and geopolitical boundaries can be provided by the terrain database 108. When the terrain sensor 128 detects, for example, a water-body, the existence of such can be confirmed by the terrain database 108 and rendered in a particular color such as blue by the processor architecture 104.

The navigation database 110 includes various types of navigation-related data stored therein. In preferred embodiments, the navigation database 110 is an onboard database that is carried by the aircraft. The navigation-related data include various flight plan related data such as, for example, and without limitation: waypoint location data for geographical waypoints; distances between waypoints; track between waypoints; data related to different airports; navigational aids; obstructions; special use airspace; political boundaries; communication frequencies; and aircraft approach information. In one embodiment, combinations of navigation-related data and terrain data can be displayed. For example, terrain data gathered by the terrain sensor 128 and/or the terrain database 108 can be displayed with navigation data such as waypoints, airports, etc. from the navigation database 110, superimposed thereon.

Although the terrain database 108, the graphical airport features database 109, and the navigation database 110 are, for clarity and convenience, shown as being stored separate from the processor architecture 104, all or portions of these databases 108, 109, 110 could be loaded into the onboard RAM 136, stored in the ROM 138, or integrally formed as part of the processor architecture 104. The terrain database

108, the graphical features database 109, and the navigation database 110 could also be part of a device or system that is physically separate from the system 100.

The positioning subsystem 111 is suitably configured to obtain geographic position data for the aircraft. In this regard, the positioning subsystem 111 may be considered to be a source of geographic position data for the aircraft. In practice, the positioning subsystem 111 monitors the current geographic position of the aircraft in real-time, and the real-time geographic position data can be used by one or more other subsystems, processing modules, or equipment on the aircraft (e.g., the navigation computer 112, the RAAS 114, the ILS 116, the flight director 118, the TAWS 122, or the TCAS 124). In certain embodiments, the positioning subsystem 111 is realized using global positioning system (GPS) technologies that are commonly deployed in avionics applications. Thus, the geographic position data obtained by the positioning subsystem 111 may represent the latitude and longitude of the aircraft in an ongoing and continuously updated manner.

The avionics data that is supplied from the onboard sensors 126 includes data representative of the state of the aircraft such as, for example, aircraft speed, altitude, attitude (i.e., pitch and roll), heading, groundspeed, turn rate, etc. In this regard, one or more of the onboard sensors 126 may be considered to be a source of heading data for the aircraft. The onboard sensors 126 can include MEMS-based, ADHRS-related or any other type of inertial sensor. As understood by those familiar with avionics instruments, the aircraft status data is preferably updated in a continuous and ongoing manner.

The weather data 120 supplied to the processor architecture 104 is representative of at least the location and type of various weather cells. The data supplied from the TCAS 124 includes data representative of other aircraft in the vicinity, which may include, for example, speed, direction, altitude, and altitude trend. In certain embodiments, the processor architecture 104, in response to the TCAS data, supplies appropriate display commands to the display element 106 such that a graphic representation of each aircraft in the vicinity is displayed on the display element 106. The TAWS 122 supplies data representative of the location of terrain that may be a threat to the aircraft. The processor architecture 104, in response to the TAWS data, preferably supplies appropriate display commands to the display element 106 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As previously alluded to, one or more other external systems (or subsystems) may also provide avionics-related data to the processor architecture 104 for display on the display element 106. In the depicted embodiment, these external systems include a flight director 118, an instrument landing system (ILS) 116, runway awareness and advisory system (RAAS) 114, and navigation computer 112. The flight director 118, as is generally known, supplies command data representative of commands for piloting the aircraft in response to flight crew entered data, or various inertial and avionics data received from external systems. The command data supplied by the flight director 118 may be supplied to the processor architecture 104 and displayed on the display element 106 for use by the user 130, or the data may be supplied to an autopilot (not illustrated). The autopilot, in turn, produces appropriate control signals that cause the aircraft to fly in accordance with the flight crew entered data, or the inertial and avionics data.

The ILS 116 is a radio navigation system that provides the aircraft with horizontal and vertical guidance just before and during landing and, at certain fixed points, indicates the distance to the reference point of landing. The system includes ground-based transmitters (not shown) that transmit radio frequency signals. The ILS 116 onboard the aircraft receives these signals and supplies appropriate data to the processor for display.

The RAAS 114 provides improved situational awareness to help lower the probability of runway incursions by providing timely aural advisories to the flight crew during taxi, takeoff, final approach, landing and rollout. The RAAS 114 uses GPS data to determine aircraft position and compares aircraft position to airport location data stored in the navigation database 110 and/or in the graphical features database 109. Based on these comparisons, the RAAS 114, if necessary, issues appropriate aural advisories. Aural advisories, which may be issued by the RAAS 114, inform the user 130, among other things of when the aircraft is approaching a runway, either on the ground or from the air at times such as when the aircraft has entered and is aligned with a runway, when the runway is not long enough for the particular aircraft, the distance remaining to the end of the runway as the aircraft is landing or during a rejected takeoff, when the user 130 inadvertently begins to take off from a taxiway, and when an aircraft has been immobile on a runway for an extended time. During approach, data from sources such as GPS, including RNP and RNAV, can also be considered.

The navigation computer 112 is used, among other things, to allow the user 130 to program a flight plan from one destination to another. The navigation computer 112 may be in operable communication with the flight director 118. As was mentioned above, the flight director 118 may be used to automatically fly, or assist the user 130 in flying, the programmed route. The navigation computer 112 is in operable communication with various databases including, for example, the terrain database 108 and the navigation database 110. The processor architecture 104 may receive the programmed flight plan data from the navigation computer 112 and cause the programmed flight plan, or at least portions thereof, to be displayed on the display element 106.

The ATC datalink subsystem 113 is utilized to provide air traffic control data to the system 100, preferably in compliance with known standards and specifications. Using the ATC datalink subsystem 113, the processor architecture 104 can receive air traffic control data from ground based air traffic controller stations and equipment. In turn, the system 100 can utilize such air traffic control data as needed. For example, taxi maneuver clearance may be provided by an air traffic controller using the ATC datalink subsystem 113.

In operation, a flight deck display system as described herein is suitably configured to process the current real-time geographic position data, the current real-time heading data, the airport feature data, and possibly other data to generate image rendering display commands for the display element 106. Thus, the synthetic graphical representation of an airport field rendered by the flight deck display system will be based upon or otherwise influenced by at least the geographic position and heading data and the airport feature data.

Figure 2:
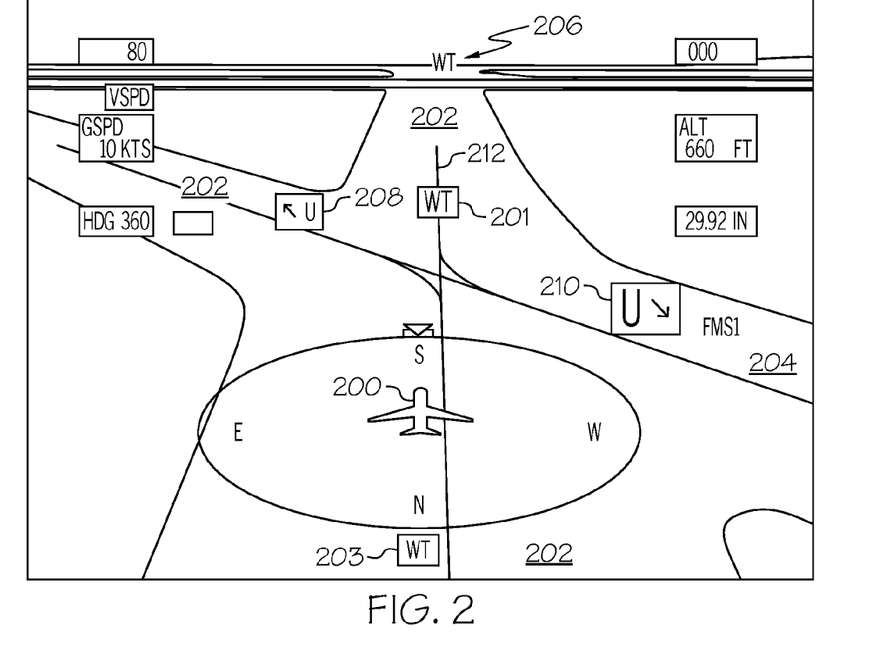
FIGS. 2-8 are graphical representations of a synthetic display having rendered thereon an airport field and related features.

As stated previously, in the traditional exocentric view, taxiway centerlines and other features will be displayed in front of the aircraft and will extend to (e.g. fade out) a predetermined distance from the nose of the aircraft; e.g. seventy-five feet. In addition, taxiway identification signs close to the aircraft are displayed as representative of real world signs and are only shown out to a predetermined fixed distance. However, taxiway identification in the distance is rendered in small white lettering. For example, on the display screen shown in FIG. 2, symbology 200 corresponding to host aircraft, is displayed on taxiway WT (WHISKEY TANGO) 202, identified by signage at 201 and 203 and intersected by taxiway U (UNIFORM) 204. As can be seen, taxiway identification signs 208 and 210 close to aircraft 200 are shown prominently as real world signs while taxiways in the distance are identified much less prominently as, for example, by smaller white lettering such as is shown at 206 to reduce the amount of displayed clutter. As the aircraft continues taxiing past one taxiway and approaches another taxiway (in this case taxiway U (UNIFORM)) 204, the real world signage 208 and 210 identifying the approaching runway U 204 fade into view. It should be noted that the rendering of centerline 212 extends only a predetermined distance in front of aircraft 200.

Figure 3:
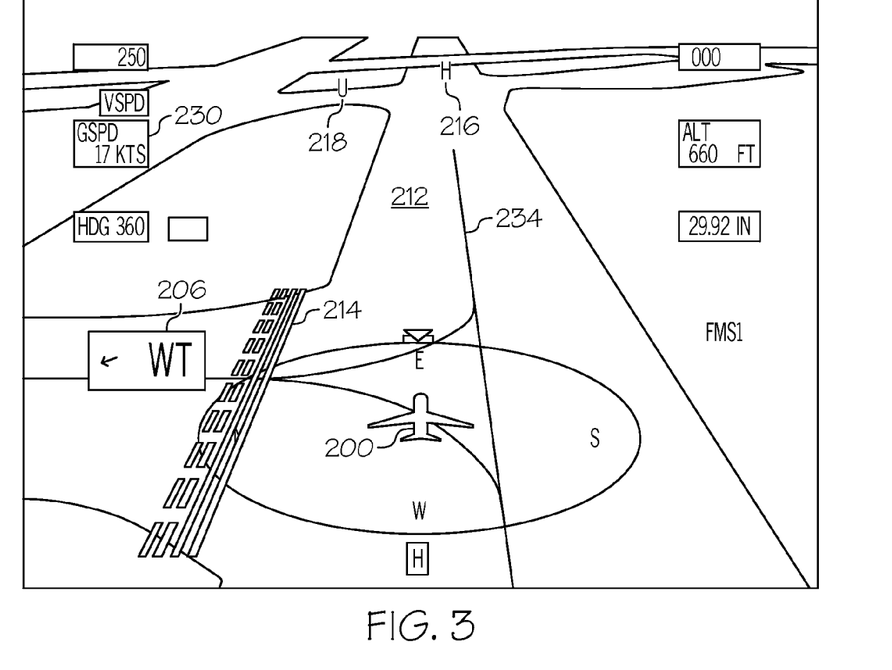

FIG. 3 illustrates a similar situation wherein aircraft 200 is proceeding down taxiway H (HOTEL) 212. As can be seen, taxiway signage WT 206 and hold bar 214 are prominently displayed proximate aircraft 200, while distant taxiway markers H at 216 and U at 218 are shown in small white letters, once again, to reduce clutter.

Figure 4:
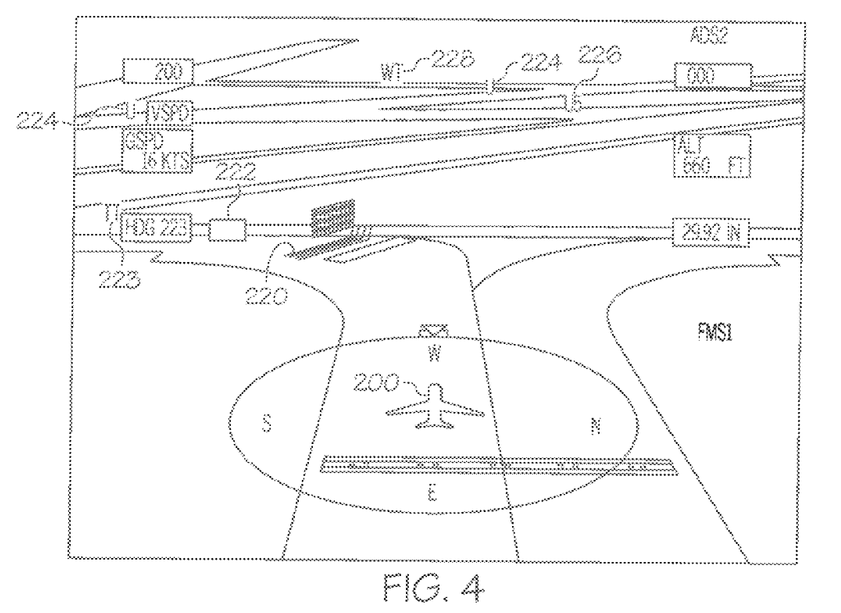

Finally FIG. 4 illustrates yet another example of airport markings such a hold short lines 22 and taxiway marking 223 close to aircraft 200 that are prominently displayed, and distant features such as taxiway identification markings 224, 226, and 228 that fade into view on the display as the aircraft approaches.

Figure 5:
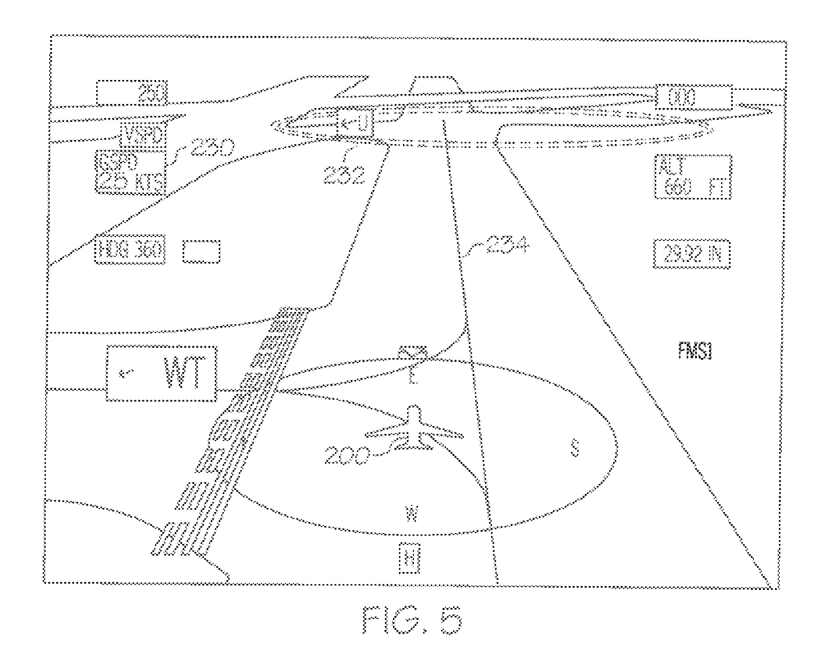

In accordance with an exemplary embodiment, there is provided, as described herein, a dynamic (i.e. smart) AMM display system including dynamic display features that increase the quality and timeliness of data provided on the display of the AMM, thus increasing crew situational awareness. Embodiments described herein contemplate a speed dependent display of information designed to improve awareness and taxi planning. In accordance with this embodiment, the higher the speed of the aircraft, the more timely the information will be rendered on the display. This may be accomplished in a linear manner or in discrete steps. For example, at or below a specified groundspeed, features may fade in at a predetermined distance from the position of the aircraft. For example, is the groundspeed is less than five knots, features that are up to seventy-five feet from the front of the aircraft are displayed on the AMM. At groundspeeds greater than the predetermined threshold, the fade-in envelope is expanded by (a) a predetermined amount, or (b) a function of the distance traveled in a predetermined period of time; e.g. the fade-in envelope is expanded by the distance the aircraft travels in four seconds, at the current groundspeed. Thus, as aircraft taxi speed is increased, airport taxiways, runways, markings, signage, etc., will fade into view sooner (i.e. will fade in at a greater distance from the aircraft), thus enabling a crew-member to see taxiway signs and markings further down the runway. Alternatively, the fade-in envelope may be expanded in a step-wise manner or linearly with speed Referring back to FIG. 3, the system displays the AMM taxiway when the groundspeed is seventeen knots (see groundspeed indicator 230). FIG. 5, however, illustrates how the display is improved using the techniques described above for an aircraft taxiing at twenty-five knots (see ground speed indicator 230). As can be seen, the identification of taxiway U (UNIFORM) 232 has been expanded as shown in FIG. 5 at 232 when contrasted with that shown in FIG. 3. Also, the centerline of taxiway H (HOTEL) 234 has been extended in FIG. 5 as compared to that in FIG. 3 at 218.

Figure 6:
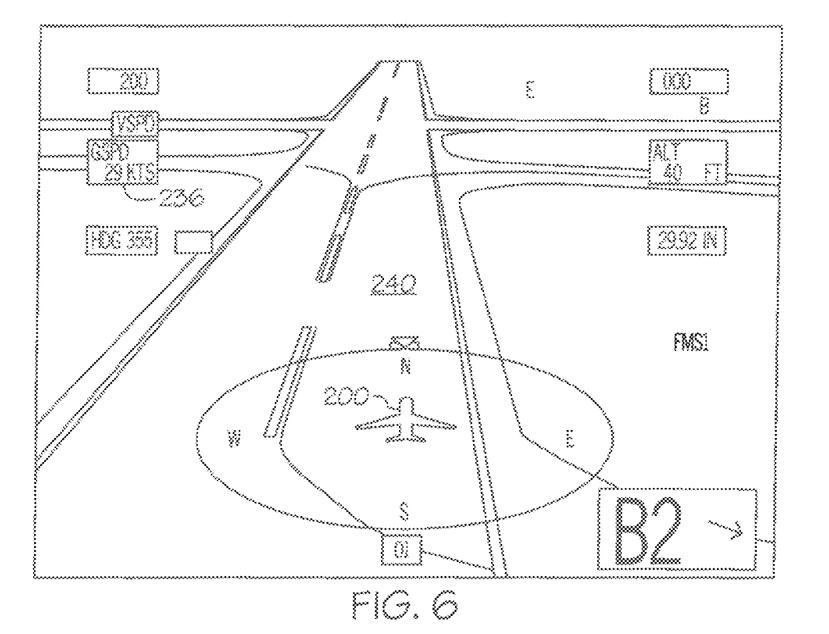
Figure 7:
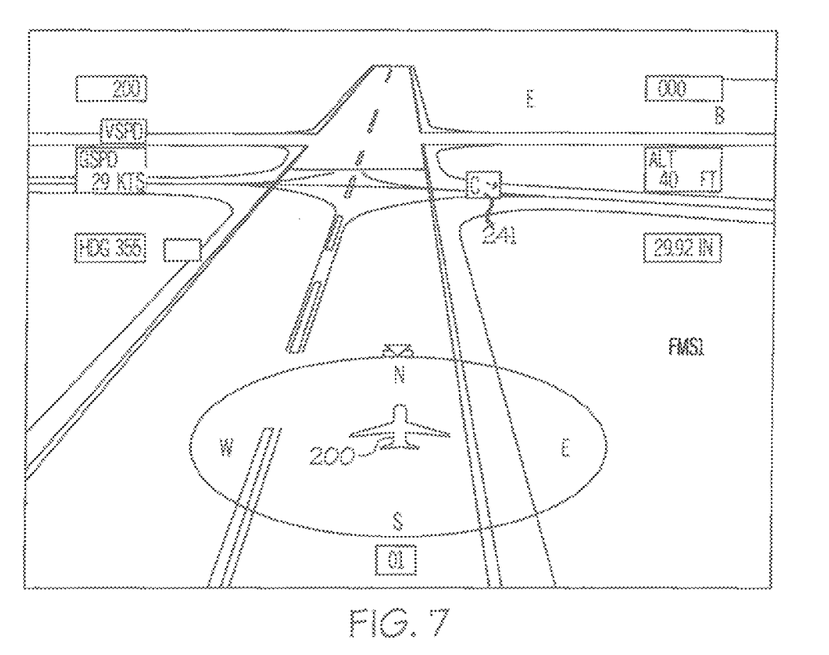
Figure 8:
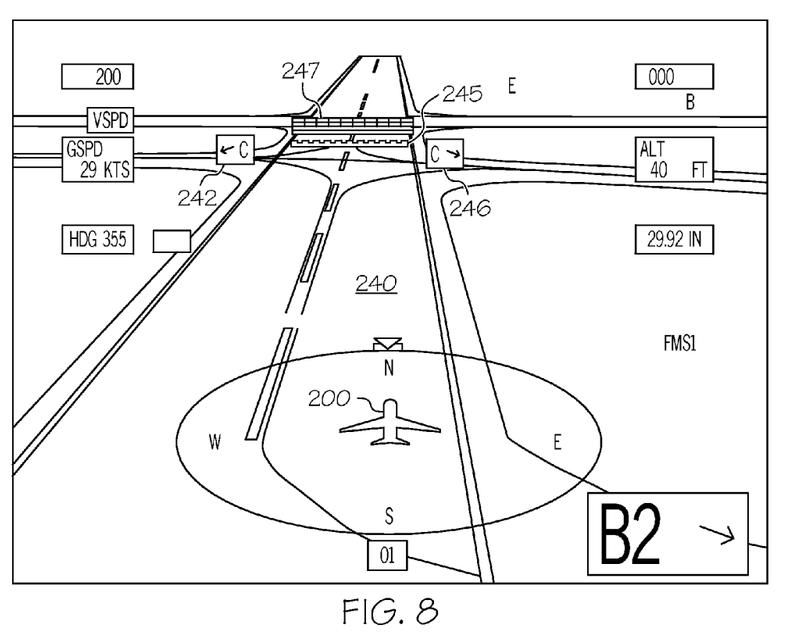

A further example is illustrated in FIG. 6 which is an example of an AMM displaying a distant view during a relatively high speed taxi (see groundspeed display 236) on a distance dependent AMM along runway 240. The aircraft is taxiing at a speed of twenty-nine knots, and, as can be seen in FIG. 6, relatively few features, such as markings, signage, etc., are displayed. Continuing on the same taxi route yields some more information (See FIG. 7) such as a taxiway sign for taxiway C (CHARLIE) 241. However, employing the speed-based techniques described herein, significantly more features and markers are displayed; e.g. taxiway signage 242 and 246 and hold bar 247 as shown in FIG. 8.

Figure 9:
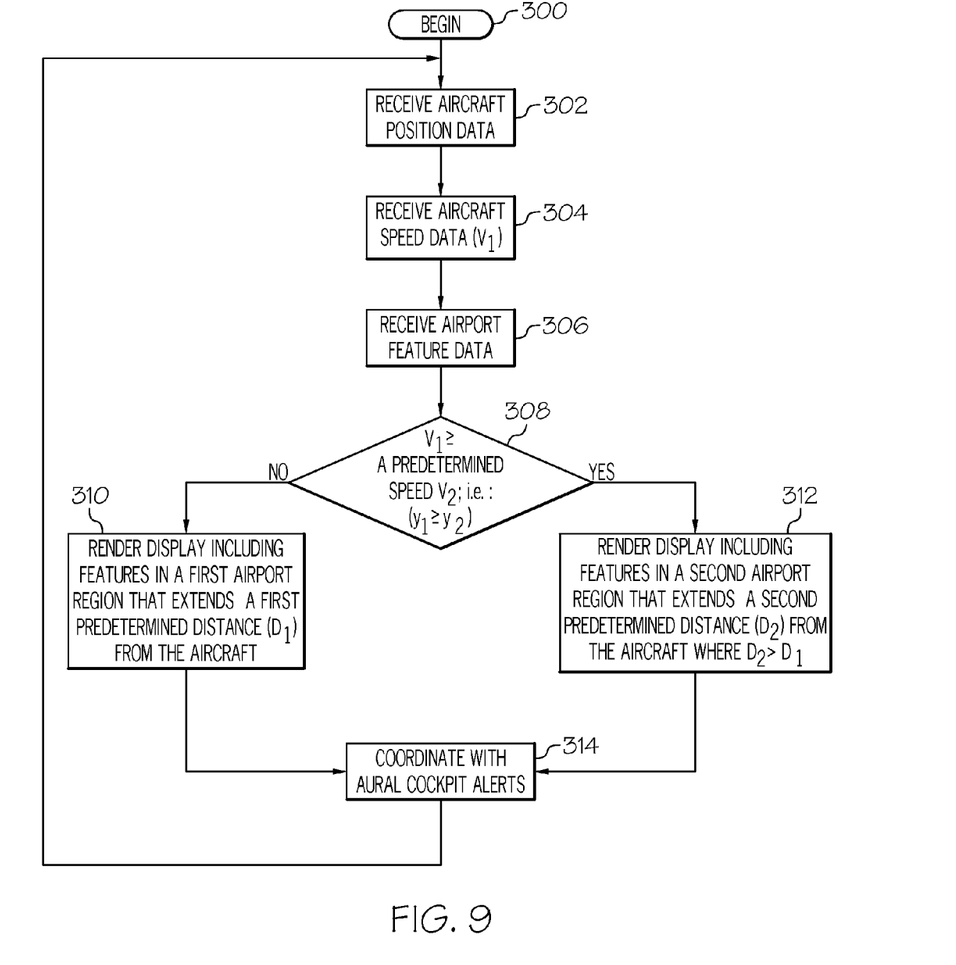
FIG. 9 is a flow chart that illustrates an exemplary embodiment of a process for rendering a dynamic AMM.

FIG. 9 is a flow chart that illustrates an exemplary embodiment of a process 300 for rendering and displaying a dynamic airport moving map; i.e. displaying a dynamic synthetic view of an airport moving map on a flight deck display system, comprising receiving aircraft position, receiving airport feature data, and receiving aircraft speed data. A three-dimensional view including airport features is rendered in a first airport region, the depth of which has a field of view extends a first predetermined distance ($D_1$) from the aircraft when the aircraft speed is less than a predetermined speed ($V_1$), and a three-dimensional view including airport features in a second airport region is rendered on the display, the depth of which has a field of view that extends a second predetermined distance ($D_2$) from the aircraft when the aircraft speed reaches a second predetermined speed ($V_2$), where $V_2$ is greater than $V_1$, and $D_2$ is greater than $D_1$. The various tasks performed in connection with the process 300 may be performed by software, hardware, firmware, or any combination thereof. For illustrative purposes, the following description of the process 300 may refer to elements mentioned above in connection with FIG. 1. In practice, portions of the process 300 may be performed by different elements of the described system, such as the processing architecture or the display element. It should be appreciated that the process 300 may include any number of additional or alternative tasks, the tasks shown in FIG. 9 need not be performed in the illustrated order, and may be incorporated into a more comprehensive procedure or process having additional functionality not described in detail herein.

Although the process 300 could be performed or initiated at any time while the host aircraft is operating, this example assumes that the process 300 is performed as the aircraft is landing or taxiing on the runway after landing. The process 300 can be performed in a virtually continuous manner at a relatively high refresh rate. For example, iterations of the process 300 could be performed in discrete steps or at a rate of 12-40 Hz (or higher) such that the synthetic flight deck display will be updated in substantially real time in a dynamic manner. In certain embodiments, the geographic position and heading data is obtained in real-time or virtually real-time such that it reflects the current state of the aircraft. The system also accesses or retrieves airport feature data (e.g. runway data including runway length, taxiways; etc.) that is associated or otherwise indicative of synthetic graphical representations of the particular airport field. As explained above, the airport feature data might be maintained onboard the aircraft, and the airport feature data corresponds to, represents, or is indicative of certain visible and displayable features of the airport field of interest. The specific airport features data that will be used to render a given synthetic display will depend upon various factors, including the current geographic position and heading data of the aircraft.

The flight deck display system can process the geographic position data, the heading data, the airport feature data including runway data, and other data if necessary in a suitable manner to generate image rendering display commands corresponding to the desired state of the synthetic display. Accordingly, the rendered synthetic display will emulate the actual real-world view from the flight deck perspective. The image rendering display commands are then used to control the rendering and display of the synthetic display on the flight deck display element. As explained in more detail below, the graphical representation of the airport field might include graphical features corresponding to taxiways and runways.

The process 300 can be repeated indefinitely and at any practical rate to support continuous and dynamic updating and refreshing of the display in real-time or virtually real-time. Updating of the displays enables the flight crew to obtain and respond to the current operating situation in virtually real-time including managing aircraft operation based on the position and speed of the aircraft on the runway.

At any given moment in time, the dynamic AMM display rendered on the flight deck display element will include a graphical representation of taxiway and runway features as described above. An exemplary embodiment of the flight deck display system may render runway features using different techniques, technologies, and schemes.

The display may include graphical representations of various features, structures, fixtures, and/or elements associated with the airport field not shown here for clarity. For example, the synthetic display may includes graphical representations of, without limitation: taxiway markings; a ramp area and related markings; parking guidance lines and parking stand lines; landscape features located at or near the airport field; terrain (e.g., mountains) located beyond the airport field; runway edges; runway shoulders; taxiway centerlines; taxiway edges or boundaries; taxiway shoulders; and airport terrain features. Of course, the various graphical features rendered at any given time will vary depending upon the particular airport of interest, the current position and heading of the aircraft, the desired amount of graphical detail and/or resolution, etc.

The various tasks performed in connection with the process 300 may be performed by software, hardware, firmware, or any combination thereof. For illustrative purposes, the following description of the process 300 may refer to elements mentioned above in connection with FIG. 1. In practice, portions of the process 300 may be performed by different elements of the described system, such as the processing architecture or the display element. It should be appreciated that the process 300 may include any number of additional or alternative tasks. The tasks shown in FIG. 9 need not be performed in the illustrated order and may be incorporated into a more comprehensive procedure or process having additional functionality not described in detail herein.

In connection with the process 300, the flight deck display system receives, analyzes and/or processes the current geographic aircraft position data (and, possibly, the current heading data) for the aircraft (STEP 302), receives aircraft speed data (STEP 304), and airport feature data (STEP 306). In addition, the process 300 determines if the aircraft speed exceeds a first predetermined speed $V_1$ (STEP 308). In addition, the process may determine, calculate, or estimate the approximate distance to a particular airport feature associated with the airport field and the time required for the aircraft to reach a designated feature, landmark, marker, point, or element associated with the airport field (STEP 308). For example, STEP 308 could determine the distance to an airport feature and the time for the aircraft to reach the feature at the then current groundspeed. The determination made during STEP 308 will be influenced, based upon, or otherwise dependent upon the current geographic position data, the speed of the aircraft, and/or other aircraft status data such as the current heading data. In addition, the process 300 might determine, calculate, or estimate the approximate physical distance between the current aircraft position and a specific airport feature. For example, this could determine the approximate distance between the aircraft and a point on the runway. In STEP 308, a determination is made as to whether or not the aircraft speed is greater than a predetermined speed. If the aircraft speed does not exceed the predetermined speed, the processor will cause to be rendered on the display only airport features that are less than a predetermined distance $D_1$ from the aircraft. (STEP 310). If the aircraft speed exceeds the predetermined speed, the processor will cause to be rendered on the display features out to a second predetermined distance $D_2$ that is greater than $D_1$ (STEP 312). The relationship between the speed of the aircraft and the distance to which airport features are displayed may be a step function as described above, a linear function, or a combination thereof. As referred to above, the display of features may be coordinated with aural alerts generated by aural annunciator 105 (FIG. 1) (STEP 314).

At any point in time, the flight deck display system can render and display the taxiway/runway features using different visually distinguishable characteristics that indicate physical or temporal proximity to the aircraft and/or that are used to reduce clutter and provide a clean synthetic display. For instance, features near to the current position of the aircraft might be rendered using a first set of visually distinguishable characteristics, while features further from the current position of the aircraft might be rendered using a second set of visually distinguishable characteristics. In this context, a visually distinguishable characteristic may be related to one or more of the following traits, without limitation: color; brightness; transparency level; translucency level; fill pattern; shape; size; flicker pattern; focus level; sharpness level; clarity level; shading; dimensionality (2D or 3D); resolution; and outline pattern. These visually distinguishable characteristics can be used to fade or introduce the signage into the display in a gradual manner. For example, a distance marker sign could gradually fade in from being fully transparent to being fully opaque or solid as the aircraft approaches that particular distance.

Thus, there has been provided a system and method for displaying a dynamic synthetic view of an airport moving map on a flight deck display system, comprising receiving airport feature data and receiving aircraft speed data ($V_1$). A three-dimensional view including airport features is rendered on the display in a first airport region that extends a first predetermined distance ($D_1$) from the aircraft when the aircraft speed is less than a predetermined speed ($V_1$), and rendering on the display a three-dimensional view including airport features is rendered in a second airport region that extends a second predetermined distance ($D_2$) from the aircraft when the aircraft speed reaches a second predetermined speed ($V_2$), where $V_2$ is greater than $V_1$, and $D_2$ is greater than $D_1$.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for enhancing situational awareness onboard an aircraft during an aircraft ground maneuver, the method comprising:

increasing the depth of the field-of-view of a three dimensional flight deck display element in response to the aircraft attaining a speed that exceeds a predetermined speed;

displaying airport features that fall within a first predetermined distance from the aircraft when the aircraft is taxiing below a predetermined speed;

increasing the area displayed to a second predetermined distance from the aircraft in accordance with aircraft speed such that, when the aircraft exceeds the predetermined speed, the second predetermined distance increases according to (i) a step function or (ii) a linear function in combination with a step function; and increasing the second predetermined distance in relation to the distance travelled by the aircraft in a predetermined period of time.

2. The method of claim 1, further comprising:
receiving aircraft position and heading data; and
retrieving airport feature data.

3. The method of claim 1, further comprising increasing the second predetermined distance in discrete steps that correspond to discrete increases in aircraft speed.

4. The method of claim 1, further comprising:
generating symbology representative of at least one of a taxiway and a runway;
displaying on the display the symbology of the at least one of a taxiway and a runway;
generating symbology representative of the aircraft; and
generating symbology representative of airport features;
displaying the aircraft and airport features that are within the first predetermined distance of the aircraft when the speed of the aircraft is below a predetermined speed; and
displaying the aircraft and airport features that are within the first predetermined distance of the aircraft and airport features that are within a second predetermined distance when the speed of the aircraft exceeds the predetermined speed.

5. The method of claim 1, wherein the airport feature data comprises one or more of runways, taxiways, runway markings, taxiway markings, center lines, identification signs, hold bars, and hold short lines.

6. The method of claim 1, further comprising coordinating the display of airport feature markings with the onset of aural alerts in the aircraft.

7. A method for displaying a dynamic synthetic view of an airport moving map on a flight deck display system on an aircraft, comprising:
receiving airport feature data;
receiving aircraft speed data;
rendering on the display system a three-dimensional view including airport features in a first airport region that extends a first predetermined distance ($D_1$) from the aircraft when the aircraft speed is less than a predetermined speed ($V_1$);
rendering on the display a three-dimensional view including airport features from the first airport region and airport features in a second airport region that extends to a second predetermined distance ($D_2$) from the aircraft when the aircraft speed exceeds the predetermined speed ($V_1$), wherein (i) the second predetermined distance is greater than the first predetermined distance and (ii) the second predetermined distance is related to the speed of the aircraft as (a) a step function or (b) a combination of a linear function and a step function; and
increasing the second predetermined distance by a distance travelled in a predetermined period of time at the current aircraft groundspeed.

8. The method of claim 7, further comprising increasing the second airport region by predetermined amounts in discrete steps that correspond to discrete increases in aircraft speed.

9. The method of claim 7, wherein the predetermined period of time is substantially four seconds.

10. The method of claim 7, wherein airport features in the first airport region are rendered using a first set of visually distinguishable characteristics, and wherein airport features and the second airport region are rendered using a second set of visually distinguishable characteristics, the second set different than the first set.

11. The method of claim 10, wherein the visually distinguishable characteristics may be related to one or more of color; brightness; transparency level; translucency level; fill pattern; shape; size; flicker pattern; focus level; sharpness level; clarity level; shading; dimensionality (2D or 3D); resolution; and outline pattern.

12. A flight deck display system, comprising:
a first source of airport feature data;
a second source of aircraft speed data;
a third source of aircraft position data;
a display element; and
a processor operatively coupled to the first, second, and third sources and to the display element and configured to (1) access the first, second, and third sources; (2) render on the display element a three-dimensional view including airport features in a first airport region that extends a first predetermined distance ($D_1$) from the aircraft when the aircraft speed is less than a predetermined speed ($V_1$); and (3) render on the display a three-dimensional view including airport features in the first airport region and a second airport region that extends a second predetermined distance ($D_2$) from the aircraft when the aircraft speed exceeds the predetermined speed ($V_1$); wherein a relationship between D2 and $V_1$ comprises one of (i) a step function, and (ii) a linear function in combination with a step function; and wherein $D_2$ is greater than $D_1$; and
wherein the processor is further configured to increase the second predetermined distance ($D_2$) by a distance travelled by the aircraft in a predetermined period of time at a current aircraft groundspeed.

* * * * *